(12) United States Patent
Choi

(10) Patent No.: US 11,564,492 B2
(45) Date of Patent: Jan. 31, 2023

(54) BLOW-MOLDED UNITARY STRUCTURE WITH ENHANCED STRENGTH

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 85 days.

(21) Appl. No.: 17/368,469

(22) Filed: Jul. 6, 2021

(65) Prior Publication Data

US 2022/0022650 A1 Jan. 27, 2022

(30) Foreign Application Priority Data

| Jul. 27, 2020 | (CN) | ............ | 202021507901.7 |
| Jul. 27, 2020 | (CN) | ............ | 202021508027.9 |
| Jul. 27, 2020 | (CN) | ............ | 202021508934.3 |
| Jun. 2, 2021 | (CN) | ............ | 202121253741.2 |

(51) Int. Cl.
*A47B 96/20* (2006.01)
*A47B 96/18* (2006.01)
*B29C 49/20* (2006.01)

(52) U.S. Cl.
CPC ........... *A47B 96/20* (2013.01); *A47B 96/18* (2013.01); *B29C 49/20* (2013.01)

(58) Field of Classification Search
CPC ..... A47B 96/20; A47B 2200/001; A47B 7/00; A47B 7/02; A47B 13/08
See application file for complete search history.

(56) References Cited

U.S. PATENT DOCUMENTS

| 893,364 | A | 7/1908 | Piaser |
| 1,063,642 | A | 6/1913 | Birdsell |
| 1,196,253 | A | 8/1916 | Lowy |
| 1,599,971 | A | 9/1926 | Melson |
| 2,136,569 | A | 11/1938 | Trimpi |
| 2,572,333 | A | 10/1951 | Greitzer |
| 2,803,033 | A | 8/1957 | Rachman |

(Continued)

FOREIGN PATENT DOCUMENTS

| CA | 2971886 | 12/2018 |
| CN | 201767333 U | 3/2011 |

(Continued)

OTHER PUBLICATIONS

U.S. Appl. No. 17/172,990, filed Feb. 10, 2021.
U.S. Appl. No. 17/193,421, filed Mar. 5, 2021.
U.S. Appl. No. 17/590,375, filed Feb. 1.

*Primary Examiner* — Daniel J Rohrhoff
(74) *Attorney, Agent, or Firm* — Morgan, Lewis & Bockius LLP

(57) ABSTRACT

A blow-molded unitary structure includes a panel having first and second panel walls and a generally hollow interior between the first and second panel walls. The structure also includes one or more different types of strengthening elements monolithically formed with the panel and across a substantial portion of the panel to enhance the strength of the structure. A strengthening element can be a depression recessing from the second panel wall toward an interior of the panel, a protrusion protruding from the second panel wall toward an exterior of the panel, a rib protruding outwardly toward the exterior of the panel and a trench formed by side walls of adjacent protrusions.

18 Claims, 19 Drawing Sheets

(56) References Cited

U.S. PATENT DOCUMENTS

| | | |
|---|---|---|
| 2,803,050 A | 8/1957 | Fernberg |
| 2,868,599 A | 1/1959 | Roggio |
| 3,027,209 A | 3/1962 | Nielsen |
| 3,075,809 A | 1/1963 | Wilson |
| 3,187,373 A | 6/1965 | Fisher |
| 3,188,138 A | 6/1965 | Lockshin |
| 3,368,504 A | 2/1968 | Cohen |
| 3,410,232 A | 11/1968 | Bills |
| 3,410,327 A | 11/1968 | Ausnit |
| 3,750,598 A | 8/1973 | Campbell |
| 3,861,328 A | 1/1975 | Lawless |
| 4,191,111 A | 3/1980 | Emmert |
| 4,244,471 A | 1/1981 | Plante |
| 4,285,105 A | 8/1981 | Kirkpatrick |
| 4,561,108 A | 12/1985 | Kamp |
| 4,597,553 A | 7/1986 | Rorabaugh |
| 4,773,108 A | 9/1988 | Leever |
| 4,792,240 A | 12/1988 | Ausnit |
| 5,180,064 A | 1/1993 | Elvin-Jensen |
| 5,226,372 A | 7/1993 | Frenkel |
| 5,325,794 A | 7/1994 | Hontani |
| 5,331,725 A | 7/1994 | Chou |
| 5,483,710 A | 1/1996 | Chan |
| 5,745,954 A | 5/1998 | Shogan |
| 5,857,229 A | 1/1999 | Magnani, Jr. |
| 6,062,589 A | 5/2000 | Cheng |
| 6,223,366 B1 | 5/2001 | Cheng |
| 6,223,628 B1 | 5/2001 | Barron |
| 6,354,230 B1 | 3/2002 | Maschio |
| 6,363,550 B1 | 4/2002 | Wang |
| 6,386,118 B1 | 5/2002 | Bendit |
| 6,508,262 B1 | 1/2003 | Takayama |
| 6,575,656 B2 | 6/2003 | Suh |
| 6,843,183 B2 | 1/2005 | Strong |
| 6,938,927 B1 | 9/2005 | Martin |
| 6,971,321 B1 | 12/2005 | Strong |
| 7,059,254 B2 | 6/2006 | Strong et al. |
| 7,066,676 B2 | 6/2006 | Tsai |
| 7,096,799 B2 | 8/2006 | Strong et al. |
| 7,097,380 B2 | 8/2006 | Lee |
| 7,144,078 B2 | 12/2006 | Hsieh |
| 7,171,910 B2 | 2/2007 | Neunzert et al. |
| 7,260,871 B2 | 8/2007 | Borchardt |
| 7,428,872 B2 | 9/2008 | Strong et al. |
| 7,475,643 B2 | 1/2009 | Haney et al. |
| 7,475,644 B2 | 1/2009 | Strong et al. |
| 7,634,969 B2 | 12/2009 | Neunzert et al. |
| 7,640,870 B2 | 1/2010 | Strong et al. |
| 7,644,667 B2 | 1/2010 | Strong et al. |
| 7,735,431 B2 | 6/2010 | Neunzert et al. |
| 7,849,867 B2 | 12/2010 | Takayama |
| 7,874,303 B2 | 1/2011 | Xie |
| 7,926,431 B2 | 4/2011 | Morris |
| 8,006,630 B2 | 8/2011 | Strong et al. |
| 8,033,228 B2 | 10/2011 | Haney et al. |
| 8,042,475 B2 | 10/2011 | Larcom et al. |
| 8,113,130 B2 | 2/2012 | Leng |
| 8,156,875 B2 | 4/2012 | Neunzert et al. |
| 8,302,541 B2 | 11/2012 | Haney et al. |
| 8,336,466 B2 | 12/2012 | Mani |
| 8,342,107 B2 | 1/2013 | Mover et al. |
| 8,534,205 B1 | 9/2013 | Johnson et al. |
| 8,578,865 B2 | 11/2013 | Haney et al. |
| 8,622,007 B2 | 1/2014 | Peery et al. |
| 8,707,478 B2 | 4/2014 | Jin |
| 8,746,155 B2 | 6/2014 | Haney et al. |
| 8,757,069 B2 | 6/2014 | Peery et al. |
| 8,806,677 B1 | 8/2014 | Bartelsmeyer |
| 8,856,984 B1 | 10/2014 | Donham |
| 8,888,123 B1 | 11/2014 | Cheng |
| 8,904,943 B2 | 12/2014 | Jin |
| 9,027,952 B2 | 5/2015 | Zhu |
| 9,103,368 B2 | 8/2015 | Mendes |
| 9,107,509 B2 | 8/2015 | Lee |
| D748,418 S | 2/2016 | Johnson et al. |
| 9,248,072 B2 | 2/2016 | Wu |
| 9,254,046 B1 | 2/2016 | Arenstein |
| 9,277,808 B2 | 3/2016 | Cai et al. |
| 9,282,812 B2 | 3/2016 | Chang |
| 9,314,386 B1 | 4/2016 | Boyd |
| D756,694 S | 5/2016 | Johnson et al. |
| 9,351,563 B2 | 5/2016 | Bennett et al. |
| 9,456,698 B2 | 10/2016 | Oh |
| 9,532,645 B1 | 1/2017 | Lin |
| 9,907,405 B2 | 3/2018 | An |
| 10,021,986 B1 | 7/2018 | Lin |
| 10,123,629 B2 | 11/2018 | Choi |
| 10,125,801 B2 | 11/2018 | Wilson |
| 10,285,506 B2 | 5/2019 | Choi |
| 10,470,561 B2 | 11/2019 | Clegg et al. |
| 10,806,246 B1 | 10/2020 | Chen |
| 10,932,560 B2 * | 3/2021 | Leng ................ A47B 13/08 |
| 11,286,083 B2 | 3/2022 | Lee |
| 2003/0009848 A1 | 1/2003 | Kuo |
| 2003/0089286 A1 | 5/2003 | Wang |
| 2003/0233967 A1 | 12/2003 | Lin |
| 2005/0005826 A1 | 1/2005 | Strong |
| 2005/0011422 A1 | 1/2005 | Wen |
| 2005/0097829 A1 | 5/2005 | Seo |
| 2005/0160950 A1 * | 7/2005 | Haney ................ A47B 13/08 |
| | | 108/129 |
| 2005/0193927 A1 * | 9/2005 | Herring ................ E04C 2/296 |
| | | 108/51.3 |
| 2005/0241550 A1 | 11/2005 | Neunzert |
| 2005/0274304 A1 | 12/2005 | Strong |
| 2005/0279260 A1 | 12/2005 | Stanford |
| 2006/0062632 A1 | 3/2006 | Jang |
| 2006/0196395 A1 | 9/2006 | Lin |
| 2006/0236902 A1 * | 10/2006 | Haney ................ A47B 13/08 |
| | | 108/115 |
| 2007/0012346 A1 | 1/2007 | Choi |
| 2007/0079441 A1 | 4/2007 | Chen |
| 2007/0195483 A1 * | 8/2007 | Asano ................ H03H 7/0153 |
| | | 361/272 |
| 2007/0199483 A1 | 8/2007 | Peery |
| 2008/0078310 A1 | 4/2008 | VanNimwegen |
| 2009/0114129 A1 | 5/2009 | Smith |
| 2009/0133191 A1 | 5/2009 | Harrow |
| 2009/0255564 A1 | 10/2009 | Xie |
| 2010/0043676 A1 | 2/2010 | Apps |
| 2010/0176634 A1 | 7/2010 | Wahl |
| 2010/0192813 A1 | 8/2010 | Fry |
| 2010/0251941 A1 | 10/2010 | Muirhead |
| 2010/0299831 A1 | 12/2010 | Lee |
| 2011/0099712 A1 | 5/2011 | Jin |
| 2012/0107037 A1 | 5/2012 | Huang |
| 2012/0141195 A1 | 6/2012 | Lu |
| 2012/0222216 A1 | 9/2012 | Jin |
| 2012/0266791 A1 * | 10/2012 | Peery ................ A47B 7/02 |
| | | 108/129 |
| 2013/0000528 A1 | 1/2013 | Jin |
| 2013/0025509 A1 | 1/2013 | Jin |
| 2013/0067659 A1 | 3/2013 | Oh |
| 2013/0081560 A1 * | 4/2013 | Peery ................ A47B 3/0911 |
| | | 108/160 |
| 2013/0133557 A1 | 5/2013 | Yoshinaga |
| 2013/0233210 A1 | 9/2013 | Jin |
| 2013/0276228 A1 | 10/2013 | Hsieh |
| 2014/0030012 A1 | 1/2014 | Lee |
| 2014/0070070 A1 | 3/2014 | Shinoda |
| 2014/0099155 A1 | 4/2014 | Chen |
| 2014/0130837 A1 | 5/2014 | Sy-Facunda |
| 2015/0130250 A1 | 5/2015 | Masunaga |
| 2015/0143630 A1 | 5/2015 | Harrow |
| 2015/0320225 A1 | 11/2015 | Boyd |
| 2015/0327684 A1 | 11/2015 | Lee |
| 2016/0157620 A1 | 6/2016 | Oh |
| 2016/0348395 A1 | 12/2016 | Jin |
| 2017/0013955 A1 | 1/2017 | Lin |
| 2017/0122353 A1 | 5/2017 | Halliburton |
| 2017/0238698 A1 * | 8/2017 | Nye ................ E04C 2/326 |
| 2018/0153302 A1 | 6/2018 | Jiang |
| 2018/0192768 A1 | 7/2018 | Choi |
| 2019/0150608 A1 * | 5/2019 | Johnson ................ A47B 13/08 |

(56) References Cited

U.S. PATENT DOCUMENTS

| | | |
|---|---|---|
| 2019/0200753 A1 | 7/2019 | Choi |
| 2019/0281983 A1* | 9/2019 | Lin .................. B29C 49/20 |
| 2019/0283304 A1 | 9/2019 | Lin |
| 2019/0284831 A1 | 9/2019 | Volin |
| 2019/0292808 A1 | 9/2019 | Dotterweich |
| 2020/0029684 A1 | 1/2020 | Jiang |
| 2020/0231333 A1 | 7/2020 | Holm |
| 2021/0031831 A1 | 2/2021 | Yoshizaki |
| 2021/0147111 A1 | 5/2021 | Lopez Uran |
| 2021/0354876 A1 | 11/2021 | Turner |
| 2022/0279922 A1* | 9/2022 | Jiang .................. A47B 13/08 |
| 2022/0288835 A1* | 9/2022 | Jiang .................. B29C 49/20 |

FOREIGN PATENT DOCUMENTS

| | | |
|---|---|---|
| CN | 204336376 U | 5/2015 |
| CN | 204336377 U | 5/2015 |
| CN | 209185860 U | 8/2019 |
| CN | 213464190 U | 6/2021 |
| DE | 29515948 | 1/1996 |
| EP | 1492432 B1 | 10/2016 |
| EP | 2701552 B1 | 7/2018 |
| GB | 810195 A | 3/1959 |
| WO | WO 2013000149 A1 | 1/2013 |

* cited by examiner

BLOW-MOLDED UNITARY STRUCTURE WITH ENHANCED STRENGTH

CROSS-REFERENCE TO RELATED APPLICATIONS

The present application claims priority to Chinese Utility Model Applications CN 202021507901.7 filed Jul. 27, 2020, CN 202021508027.9 filed Jul. 27, 2020, CN 202021508934.3 filed Jul. 27, 2020, and CN202121253741.2 filed Jun. 2, 2021. The disclosure of each application is incorporated herein for all purposes by reference in its entirety.

FIELD OF THE INVENTION

The present invention generally relates to blow-molded structures and, in particular, to blow-molded unitary structures with enhanced strength.

BACKGROUND

Some existing tabletops are made by blow molding plastics. Such tabletops are usually hollow structures with insufficient strength. In use or during transportation, they can be easily bent and deformed.

Given the current state of the art, there remains a need for blow-molded structures that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides blow-molded unitary structures with enhanced strength. The structures can be used, for instance, as a tabletop, a benchtop, a countertop, a bed panel, or the like.

In various exemplary embodiments, the present disclosure provides a blow-molded unitary structure including a panel, a plurality of depressions, and a plurality of protrusions. The panel includes a first panel wall and a second panel wall spaced apart from the first panel wall. The plurality of depressions is monolithically formed with the panel, each recessing from the second panel wall toward an interior of the panel. Each depression in the plurality of depressions includes an open depression top at the second panel wall, a closed depression bottom opposite to the open depression top, and a depression side wall connecting the open depression top and the closed depression bottom. The plurality of protrusions is also monolithically formed with the panel, each protruding from the second panel wall toward an exterior of the panel. Each protrusion in the plurality of protrusions includes an open protrusion base at the second panel wall, and a closed protrusion cover surrounding the open protrusion base. Depressions in at least a subset of the plurality of depressions are arranged alternately with protrusions in at least a subset of the plurality of protrusions across at least a portion of the panel. The plurality of depressions and the plurality of protrusions collectively enhance a strength of the blow-molded unitary structure.

In some exemplary embodiments, the blow-molded unitary structure further includes a plurality of ribs monolithically formed with the panel. Each respective rib in the plurality of ribs protrudes outwardly toward the exterior of the panel, and each respective rib in at least a subset of the plurality of ribs connects corresponding adjacent protrusions in the plurality of protrusions.

In some exemplary embodiments, the second panel wall is substantially parallel to the first panel wall.

In an exemplary embodiment, a depression is separated from its adjacent depression in the plurality of depressions by a distance that is from about 3 to about 7 (e.g., about 3, 4, 5, 6 or 7) times a thickness of the structure.

In some exemplary embodiments, the closed depression bottom is formed monolithically at the first panel wall or is a part of the first panel wall.

In an exemplary embodiment, the subset of the plurality of depressions and the subset of the plurality of protrusions are arranged substantially uniformly across the portion of the panel.

In an exemplary embodiment, the plurality of depressions and the plurality of protrusions are arranged substantially across the panel.

In some exemplary embodiments, the closed protrusion cover of each protrusion in at least a subset of the plurality of protrusions is substantially rounded.

In some exemplary embodiments, the closed protrusion cover of each protrusion in at least a subset of the plurality of protrusions includes a top and a side wall connecting the top with the open protrusion base of each respective protrusion.

In some exemplary embodiments, the top of the closed protrusion cover is arched or dome-shaped.

In an exemplary embodiment, an edge between the top and side wall of the closed protrusion cover is arched.

In some exemplary embodiments, the top of the closed protrusion cover is substantially planar and parallel to the second panel wall.

In some exemplary embodiments, a trench is formed between the side walls of adjacent protrusions in the subset of the plurality of protrusions.

In some exemplary embodiments, the trench connects two depressions adjacent to the side walls.

In an exemplary embodiment, the trench has a width that is substantially equal to or less than a width of any one of the two depressions.

In various exemplary embodiments, the present disclosure provides a blow-molded unitary structure including a panel, a plurality of depressions and a plurality of protrusions. The panel includes a first panel wall and a second panel wall spaced apart from the first panel wall. The plurality of depressions is monolithically formed with the panel, each recessing from the second panel wall toward an interior of the panel. The plurality of protrusions is also monolithically formed with the panel, each protruding from the second panel wall toward an exterior of the panel. Each protrusion in the plurality of protrusions includes an open protrusion base at the second panel wall, and a closed protrusion cover surrounding the open protrusion base. The closed protrusion cover of each protrusion in at least a subset of the plurality of protrusions includes a substantially planar top and a side wall connecting the substantially planar top with the open protrusion base of each respective protrusion. A trench is formed between the side walls of adjacent protrusions in the subset of the plurality of protrusions, and connects two depressions adjacent to the side walls.

In some exemplary embodiments, the trench has a width that is substantially equal to or less than a width of any one of the two depressions.

In various exemplary embodiments, the present disclosure provides a blow-molded unitary structure including a panel, a plurality of depressions, a plurality of protrusions, and a plurality of ribs. The panel includes a first panel wall and a second panel wall spaced apart from the first panel wall. The plurality of depressions is monolithically formed with the panel, each recessing from the second panel wall toward an interior of the panel. The plurality of protrusions is also monolithically formed with the panel, each protruding from the second panel wall toward an exterior of the panel. Each protrusion in the plurality of protrusions includes an open protrusion base at the second panel wall, and a closed protrusion cover surrounding the open protrusion base. The plurality of ribs is also monolithically formed with the panel, each protruding outwardly toward the exterior of the panel. Each respective rib in at least a subset of the plurality of ribs connects corresponding adjacent protrusions in the plurality of protrusions.

In some exemplary embodiments, the closed protrusion cover of each protrusion in at least a subset of the plurality of protrusions includes an arched or dome-shaped top and a side wall connecting the arched or dome-shaped top with the open protrusion base of each respective protrusion.

In an exemplary embodiment, an edge between the arched or dome-shaped top and side wall of the closed protrusion cover is arched.

In various exemplary embodiments, the present disclosure provides a blow-molded unitary structure including a panel, a plurality of first depressions, a plurality of first protrusions, and a plurality of second protrusions. The panel includes a first panel wall and a second panel wall spaced apart from the first panel wall. The plurality of first protrusions monolithically formed with the panel, each protruding from the second panel wall toward an exterior of the panel and elongated in the first direction. The plurality of second protrusions is monolithically formed with the panel, each protruding from the second panel wall toward an exterior of the panel and elongated in the second direction. At least a subset of the plurality of first depressions is arranged into a plurality of depression rows in a first direction and a plurality of depression columns in a second direction across at least a portion of the panel. Moreover, first protrusions in at least a subset of the plurality of first protrusions are arranged alternatively with depression rows in at least a subset of the plurality of depression rows. Second protrusions in at least a subset of the plurality of second protrusions are arranged alternatively with depression columns in at least a subset of the plurality of depression columns. Further, the first protrusions in the subset of the plurality of first protrusions and the second protrusions in the subset of the plurality of second protrusions cross each other. The plurality of first depressions, the plurality of first protrusions, and the plurality of second protrusions collectively enhance a strength of the blow-molded unitary structure.

In some exemplary embodiments, the blow-molded unitary structure further includes a plurality of reinforcement members, each monolithically formed at a first depression in the plurality of first depressions.

In an exemplary embodiment, the number of reinforcement members is the same as the number of first depressions, and one reinforcement is formed at each first depression in the plurality of first depressions.

In some exemplary embodiments, each reinforcement member in the plurality of reinforcement members is formed at a depression bottom of a corresponding first depression in the plurality of first depressions.

In an exemplary embodiment, each reinforcement member in the plurality of reinforcement members is recessed from the depression bottom of the corresponding first depression in the plurality of first depressions towards the first panel wall.

In some exemplary embodiments, the reinforcement member includes a plurality of reinforcement elements connected with each other at their ends.

In an exemplary embodiment, a first protrusion in the plurality of first protrusions and a second protrusion in the plurality of second protrusions have different heights.

In some exemplary embodiments, a height of a first protrusion in the plurality of first protrusions or a second protrusion in the plurality of second protrusions is about $1/7$ to about $4/5$ of a distance between two adjacent first depressions, about $1/6$ to about $3/4$ of the distance between two adjacent first depressions, or about $1/5$ to about $2/3$ of the distance between two adjacent first depressions. In an exemplary embodiment, the distance between two adjacent first depressions is measured from a center of one first depression to a center of the other first depression.

In some exemplary embodiments, a width of a first protrusion in the plurality of first protrusions or a second protrusion in the plurality of second protrusions is about $1/7$ to about $1/2$ of a distance between two adjacent first depressions, about $1/6$ to about $2/5$ of the distance between two adjacent first depressions, or about $1/5$ to about $1/3$ of the distance between two adjacent first depressions. In an exemplary embodiment, the distance between two adjacent first depressions is measured from a center of one first depression to a center of the other first depression.

In some exemplary embodiments, a first depression in the plurality of depression rows or in the plurality of depression columns is surrounded by a transition member that connects the first depression with adjacent first and second protrusions. In an exemplary embodiment, the transition member comprises a first step and a second step.

In some exemplary embodiments, the blow-molded unitary structure further comprises a second depression monolithically formed with the panel and recessing from the second panel wall toward the interior of the panel. The second depression is curvy and disposed along one or more edges of the panel. In an exemplary embodiment, the second depression has a substantially wave shape.

In some exemplary embodiments, a first protrusion in the plurality of first protrusions or a second protrusion in the plurality of second protrusion has a tunnel shape.

The structures of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

Figure 1:
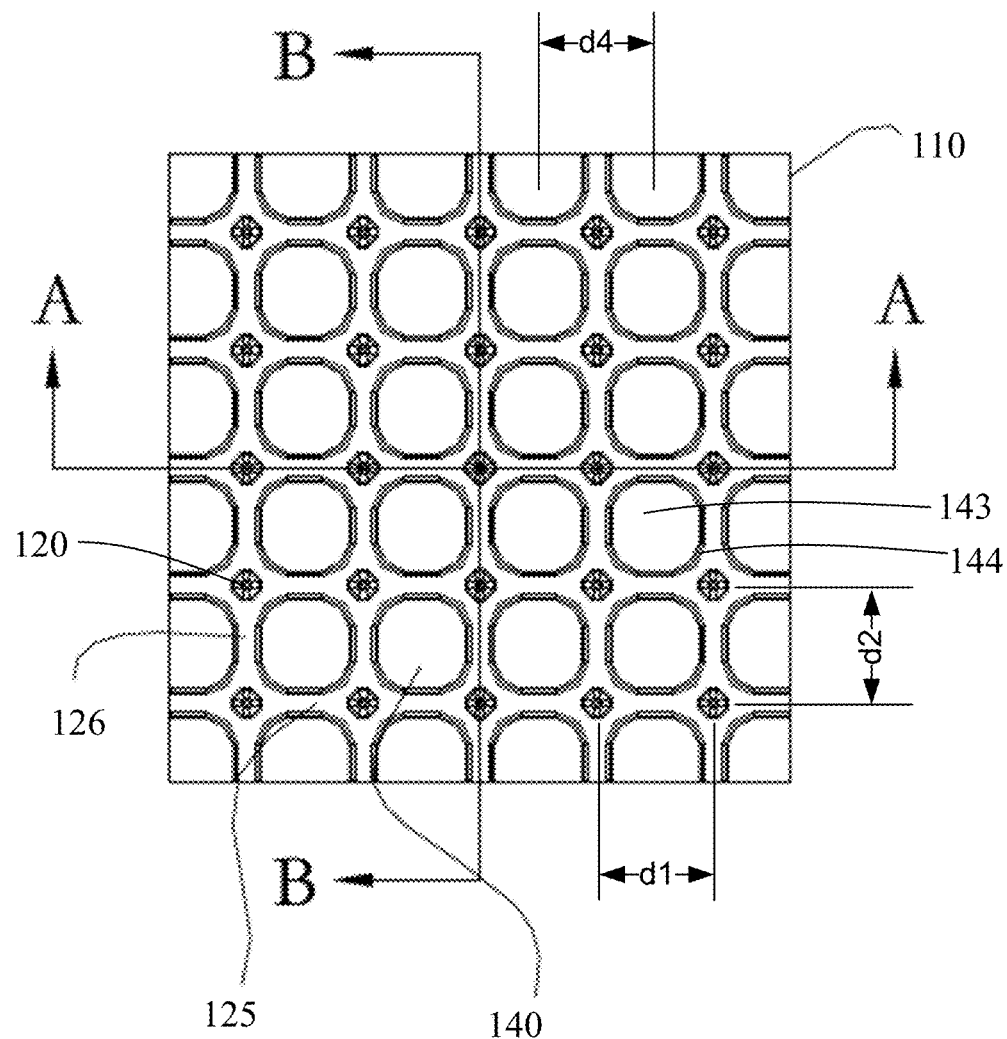
FIG. 1 is a bottom view illustrating an exemplary structure in accordance with some exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of structures with enhanced strength. An exemplary structure of the present invention is a unitary piece formed by blow molding plastics such as high density polyethylene (HDPE), low density polyethylene (LDPE), polypropylene (PP), polyvinyl chloride (PVC), polyethylene terephthalate (PET), thermoplastic elastomers (TPE), or the like. An exemplary structure of the present disclosure can be used, for instance, as a tabletop, a benchtop, a countertop, a bed panel, or the like.

A structure of the present disclosure generally includes a panel having two or more panel walls and a generally hollow interior formed between the panel walls. The panel can be of various regular or irregular shapes, including but not limited to a square shape, a round shape or a rectangular shape.

A structure of the present disclosure also includes one or more different types of strengthening elements monolithically formed with the panel, thereby creating a unitary one-piece structure with enhanced strength. Strengthening elements include, but are not limited to, a plurality of depressions, a plurality of protrusions, a plurality of ribs, a plurality of trenches, or any combination thereof. In some exemplary embodiments, the strengthening elements are distributed across at least a portion of the panel. The strengthening elements enhance the strength of the structure (e.g., increases rigidity of the structure) and prevent the structure from bending, warping or deforming.

The strengthening elements (e.g., depressions, protrusions, ribs, or trenches) can have any suitable shapes, sizes or orientations. For instance, a depression can have a regular (e.g., rectangular, square, circular, oblong or the like) or irregular shape. In addition, adjacent depressions can have the same configuration or different configurations. In some exemplary embodiments, a depression includes a stepwise side wall configured to increase the strength of the depression and accordingly to increase the strength of the panel and/or structure. Similarly, a protrusion/rib/trench can have a regular or irregular shape, and adjacent protrusions/ribs/trenches can have the same configuration or different configurations.

The depressions, protrusions, ribs, and/or trenches can be formed at any suitable positions independent from each other or related to each other. For instance, a protrusion can be formed at a position adjacent to none of the plurality of depressions, or at a position adjacent to 1, 2 or more than 2 depressions. Likewise, a depression can be formed at a position adjacent to none of the plurality of protrusions, or at a position adjacent to 1, 2 or more than 2 protrusions. The depressions, protrusions, ribs, and/or trenches can be arranged uniformly or nonuniformly across the panel. In some exemplary embodiments, depressions in at least a subset of the plurality of depressions are arranged alternately with protrusions in at least a subset of the plurality of protrusions across at least a portion of the panel. In some exemplary embodiments, the plurality of depressions and the plurality of protrusions are arranged substantially uniformly across the panel.

Referring now to FIGS. 1-5, there is depicted exemplary structure 100 in accordance with some exemplary embodiments of the present disclosure. As shown, structure 100 includes a panel such as panel 110. The panel usually includes multiple walls and a generally hollow interior. For instance, in some exemplary embodiments, panel 110 includes first panel wall 111, second panel wall 112 and generally hollow interior 113. First panel wall 111 and second panel wall 112 are spaced apart from each other (e.g., in the vertical direction of FIG. 2), creating generally hollow interior 113 in between.

The first and second wall panels can be, but do not have to be, completely spaced apart from each other. For instance, in some exemplary embodiments, the first and second wall panels can be joined with each other at one or more locations. Similarly, the generally hollow interior can be completely hollow or partially hollow with one or more structures formed or disposed within. Additionally, the first and second panel walls each can be planar or nonplanar. For instance, in an exemplary embodiment, each of the first and second panel walls is substantially planar, and the first and second panel walls are substantially parallel to each other. In another exemplary embodiment, at least a portion of the first or second panel wall is curved.

Figure 2:
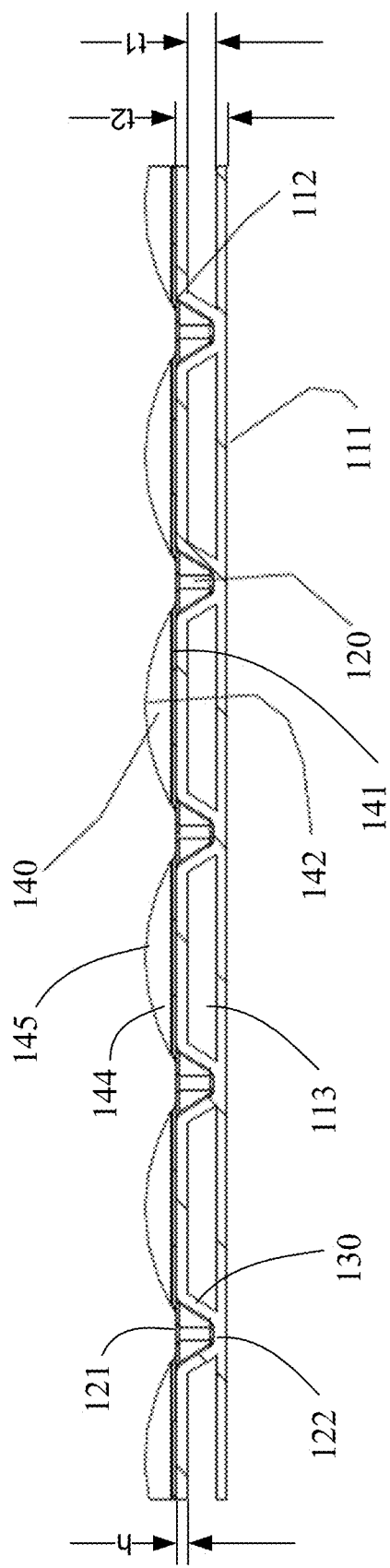
FIG. 2 is a schematic cross-sectional view taken along line A-A of FIG. 1.
Figure 3:
FIG. 3 is a schematic cross-sectional view taken along line B-B of FIG. 1.

The first and second panel walls can have the same thickness or different thicknesses. By way of example, FIG. 2 illustrates the first and second panel walls having substantially the same thickness indicated by h. In some exemplary embodiments, a distance separating the first and second panel walls is about 2, 3, 4, 5, or more than about 5 times a thickness of the first or second panel wall. In an exemplary embodiment, the distance separating the first and second panel walls is from about 4 to about 7 (e.g., about 4, 5, 6, or 7) times a thickness of the first or second panel wall.

In some exemplary embodiments, structure 100 includes a plurality of depressions, such as depression 120, monolithically formed with the panel and thus creates a unitary one-piece structure. Different depressions can be but do not have to be identical or substantially the same as each other. For instance, different depressions can have the same or different shapes or sizes, or can be arranged in the same or different orientations. By way of example, FIGS. 1-5 illustrates the plurality of depressions 120 monolithically formed with the first or second panel wall, each recessing from the second panel wall toward the interior of the panel (e.g., toward the first panel wall).

In some exemplary embodiments, depression 120 includes an open top such as open top 121. Cross-sectionalwise, the open top can have any suitable regular or irregular shapes, including but not limited to polygon (e.g. triangle, rectangle, square, diamond), circle, oblong, oval, or the like. Depression 120 also includes a closed bottom, such as closed bottom 122, opposite to the open top. The closed bottom can be completely separated from first panel wall 111 (e.g., there is a gap between the closed bottom and the first panel wall), or formed at the first panel wall (e.g., the closed bottom is part of the first panel wall), or anywhere in between. By way of example, FIG. 2 illustrates the depression having the close bottom formed at the first panel wall and being part of the first panel wall. Depression 120 also includes a depression side wall such as depression side wall 130. The depression side wall joins or connects the open top and close bottom of the depression.

Depressions 120 can be distributed uniformly, generally uniformly, or non-uniformly across at least a portion of the panel, in which adjacent depressions are generally spaced apart from each other. For instance, in some exemplary embodiments, two adjacent protrusions 140 are spaced apart from each other, forming a gap, such as gap 125 or gap 126, between the edges or side walls of the two adjacent depressions. Gap 125 and gap 126 can be the same as or different from each other. In some exemplary embodiments, at least some of the depressions are arranged in a pattern, which can be regular or irregular. For instance, some or all of the depressions are arranged to form row(s), column(s), circle(s) or the like. In some exemplary embodiments, the open top has a substantially square shape, and the plurality of depressions is arranged in a pattern such that each edge of the substantially square shaped open top is oriented at an angle with respect to an edge of the panel. For instance, in an exemplary embodiment, the plurality of depressions is arranged in a pattern such that each edge of the substantially square shaped open top is oriented at substantially 45 degrees with respect to a side edge of the panel.

In some exemplary embodiments, adjacent depressions are separated by a distance greater than a thickness of the structure. For instance, in an exemplary embodiment, the distance separating two adjacent depressions is more than about 2, more than about 3, or more than about 4 times the thickness of the structure. In another exemplary embodiment, the distance separating two adjacent depressions is from about 3 to about 7 (e.g., about 3, 4, 5, 6, or 7) times the thickness of structure. In still another exemplary embodiment, the distance separating two adjacent depressions is from about 3 to about 5 (e.g., about 3, 4, or 5) times the thickness of structure. The distance separating two adjacent depressions can be measured from center-to-center or edge to edge of the adjacent depressions. For instance, "d1" and "d2" in FIG. 1 indicate the distance separating adjacent depressions in a row or column, respectively, measured from center-to-center of the adjacent depressions. "d3" in FIG. 4 indicates the distance separating diagonally adjacent depressions measured from center-to-center of the adjacent depressions. In some exemplary embodiments, the distance separating two adjacent depressions measured from edge to edge of the adjacent depressions equals substantially the length of the gap (e.g., gap 125 or gap 126) between the two adjacent depressions. The thickness of the structure is generally measured from the first panel wall to the second panel wall, as illustrated by "t1" (e.g., from the exterior surface of the first panel wall to the exterior surface of the second panel wall), or from the first panel wall to the top of the closed protrusion cover, as illustrated by "t2" (e.g., from the exterior surface of the first panel wall to the exterior surface of the top of the closed protrusion cover) in FIG. 2.

As a non-limiting example, in an exemplary embodiment, the distance separating two adjacent depressions in a row or a column is about 47 mm or the like. The distance separating two diagonally adjacent depressions is about 66 mm or the like. The length of the gap (e.g., the distance separating adjacent depressions measured from edge to edge of the adjacent depressions) is about 33 mm or the like. The thickness of the structure measured from the first panel wall to the second panel wall is about 9.5 mm or the like.

In some exemplary embodiments, structure 100 includes a plurality of protrusions, such as protrusion 140, monolithically formed with the panel and thus creates a unitary one-piece structure. Different protrusions can be but do not have to be identical or substantially the same as each other. For instance, different protrusions can have the same or different shapes or sizes, or can be arranged in the same or different orientations. By way of example, FIGS. 1-5 illustrates the plurality of protrusions 140 monolithically formed with the second panel wall, each protruding from the second panel wall toward an exterior of the panel (e.g., protruding in a direction opposite to the first panel). In a non-limiting exemplary embodiment, the height of a protrusion (e.g., the distance measured from the second panel to the top of the protrusion) is about 3.5 mm or the like.

Figure 4:
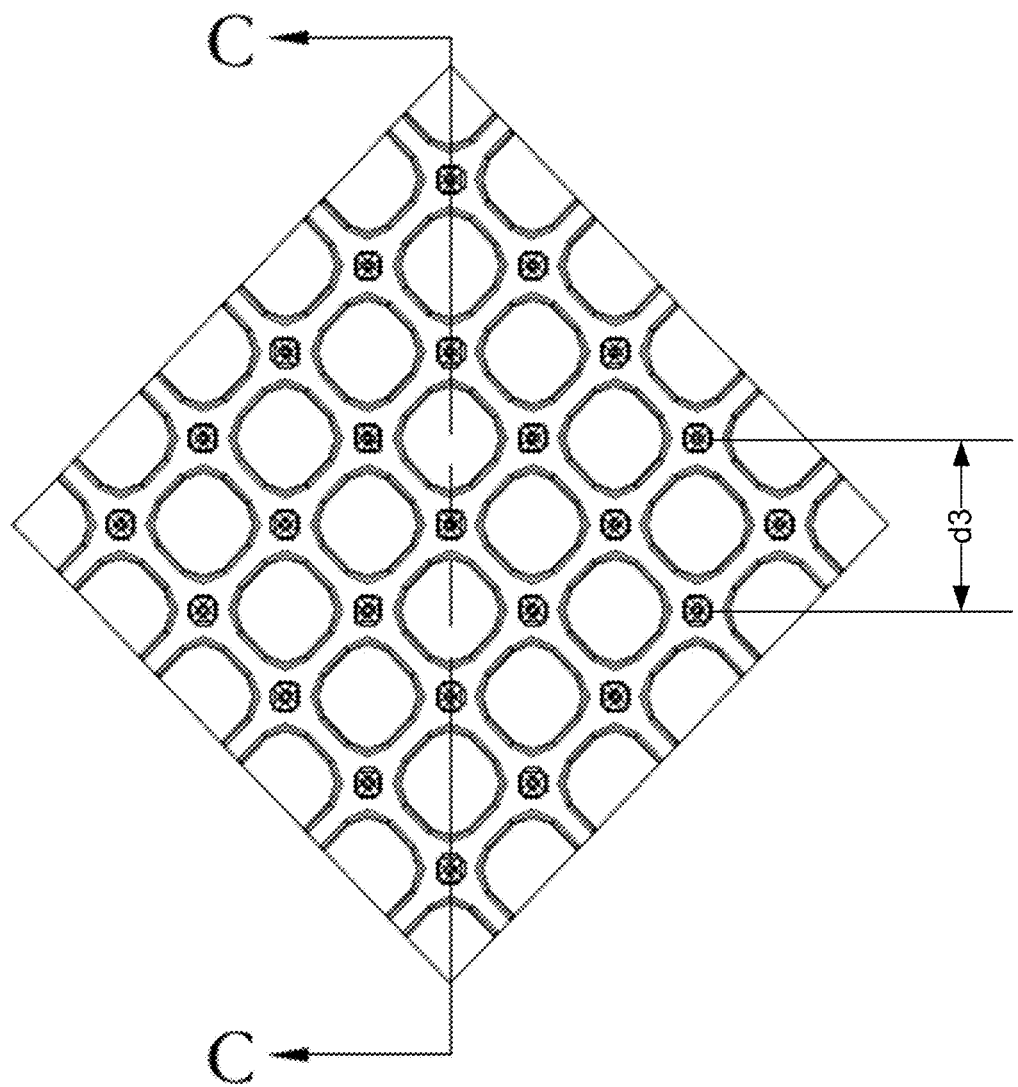
FIG. 4 is a bottom view illustrating the exemplary structure of FIG. 1.
Figure 5:
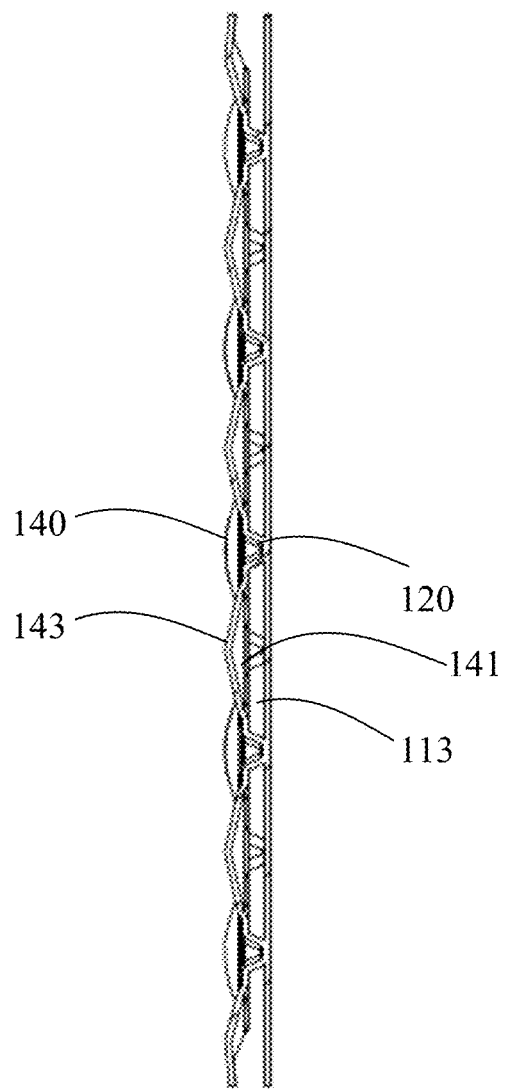
FIG. 5 is a schematic cross-sectional view taken along line C-C of FIG. 4.
Figure 6:
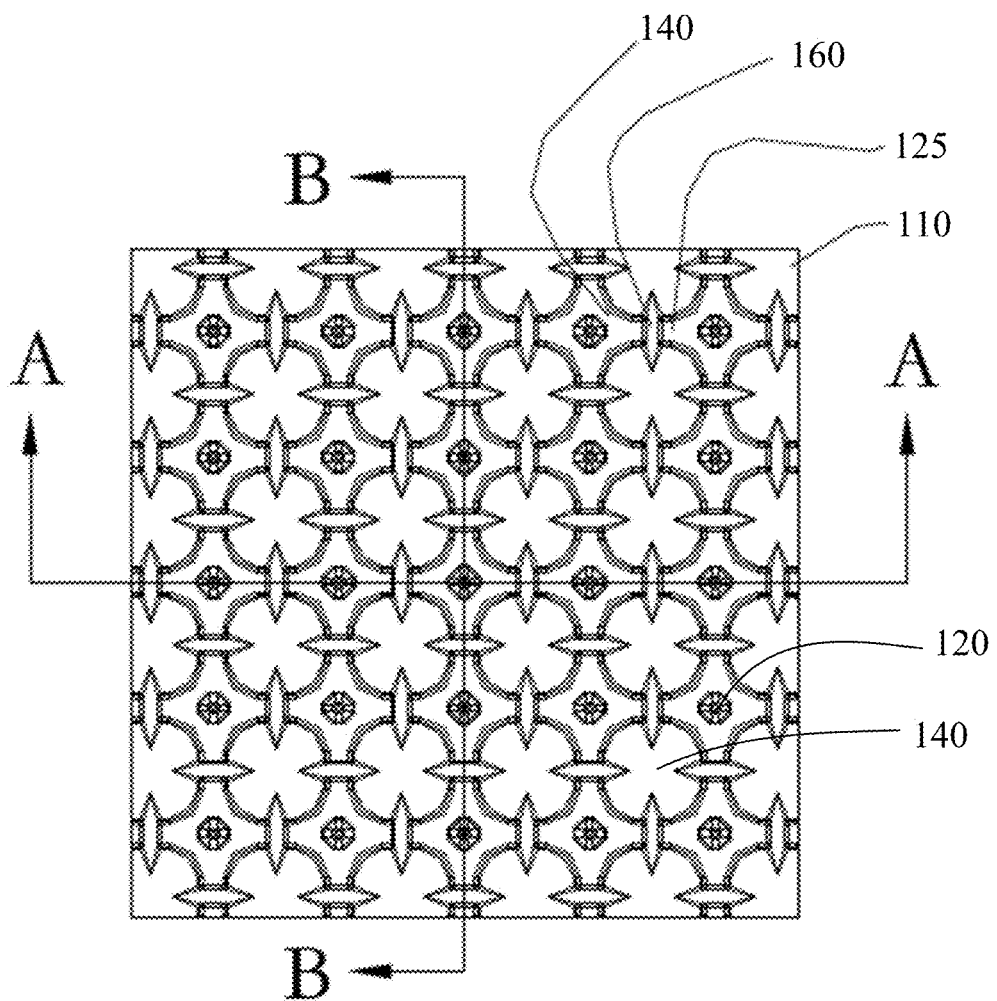
FIG. 6 is a bottom view illustrating an exemplary structure in accordance with some exemplary embodiments of the present disclosure.
Figure 7:
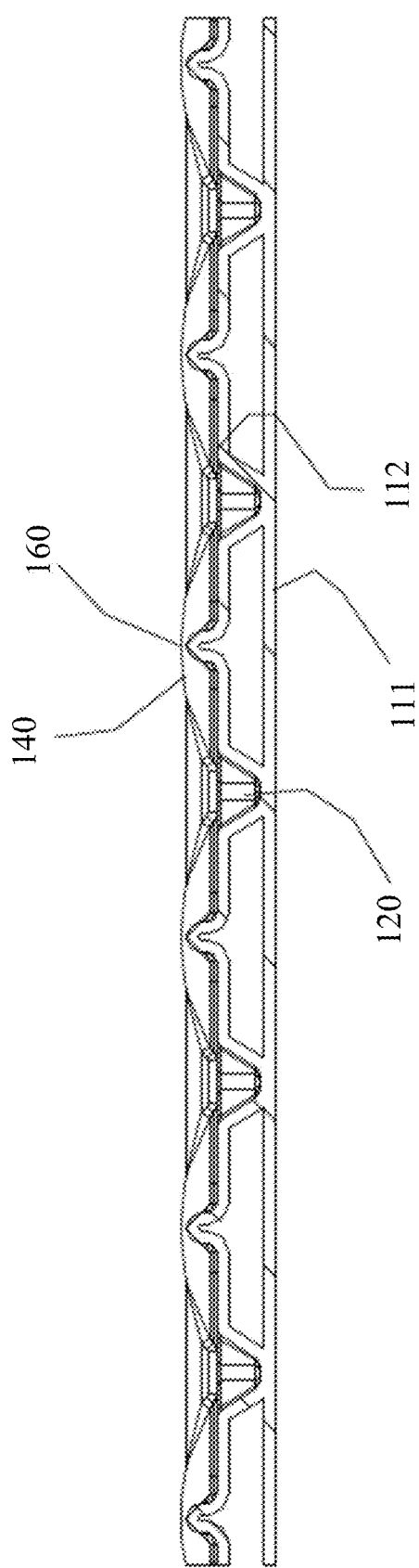
FIG. 7 is a schematic cross-sectional view taken along line A-A of FIG. 6.
Figure 8:
FIG. 8 is a schematic cross-sectional view taken along line B-B of FIG. 6.
Figure 9:
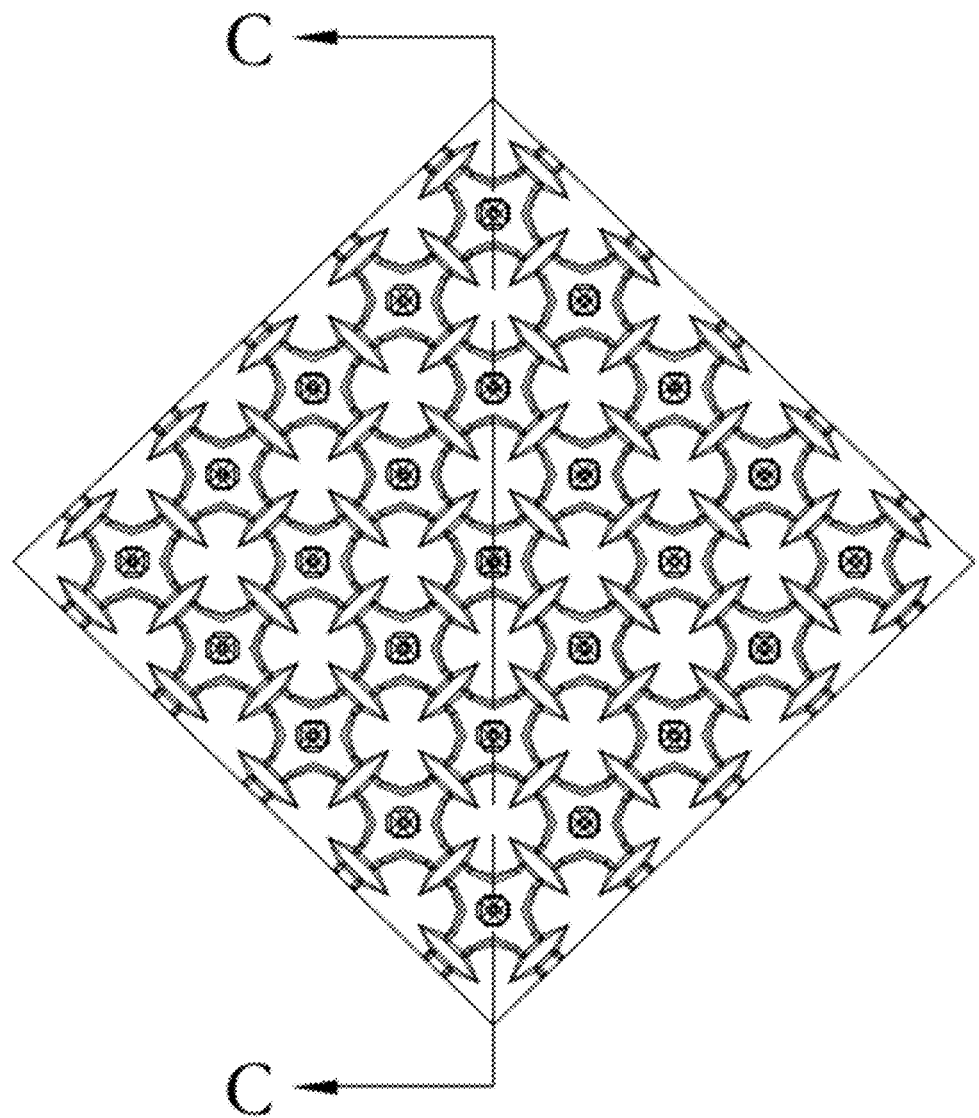
FIG. 9 is a bottom view illustrating the exemplary structure of FIG. 6.
Figure 10:
FIG. 10 is a schematic cross-sectional view taken along line C-C of FIG. 9.
Figure 11:
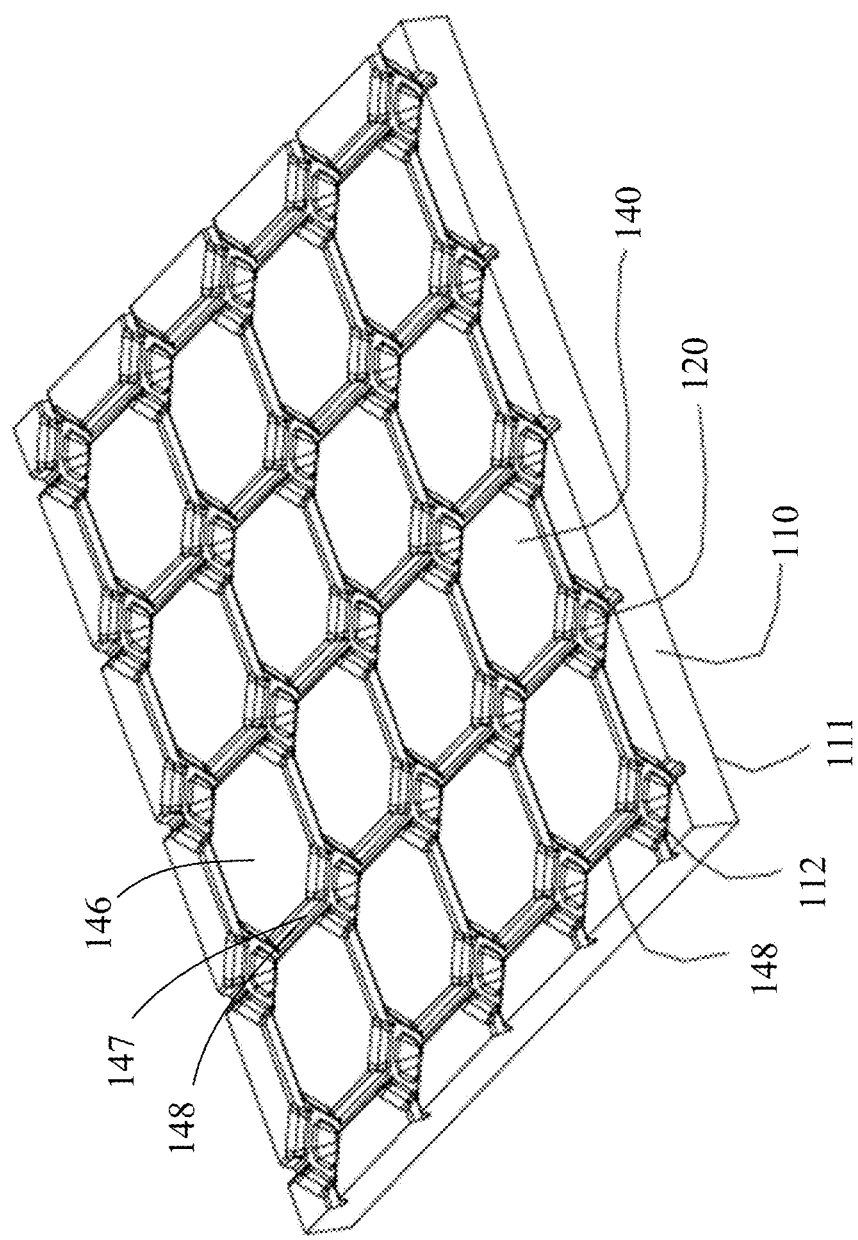
FIG. 11 is a bottom perspective view illustrating an exemplary structure in accordance with some exemplary embodiments of the present disclosure.
Figure 12:
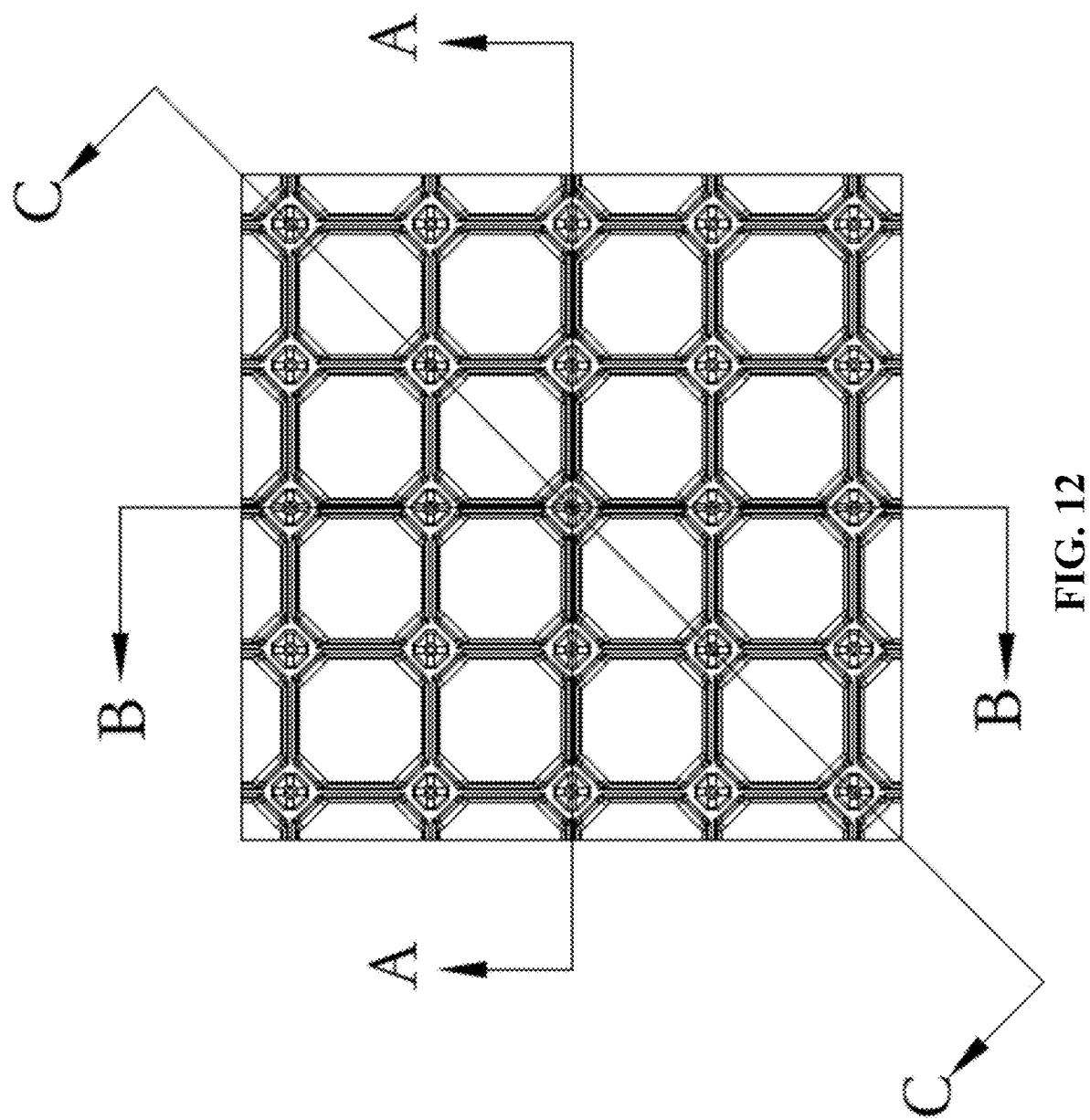
FIG. 12 is a bottom view illustrating the exemplary structure of FIG. 11.
Figure 13:
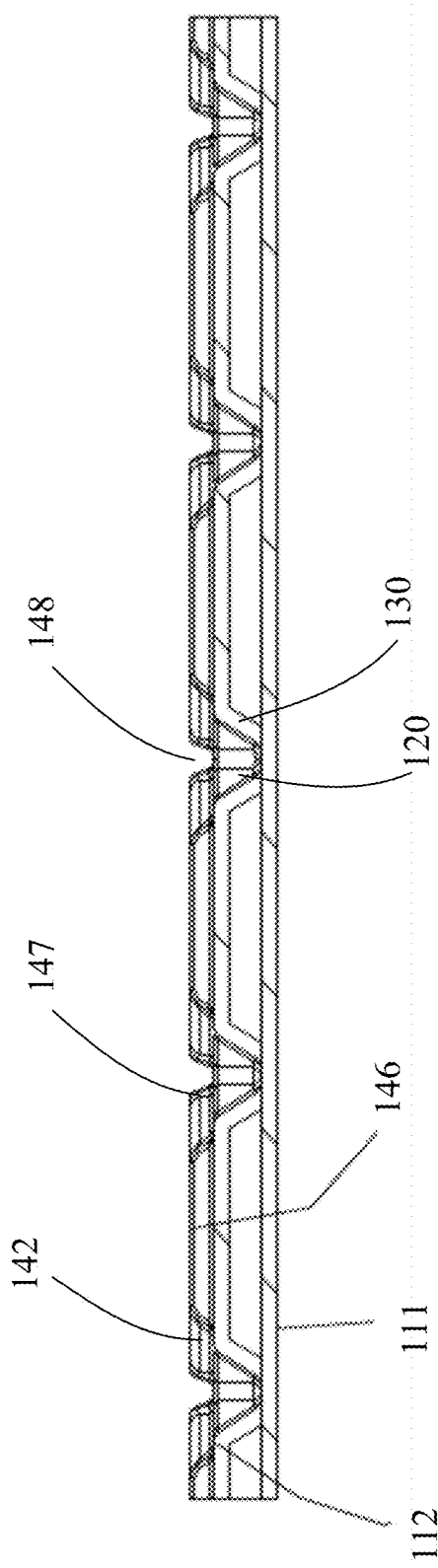
FIG. 13 is a schematic cross-sectional view taken along line A-A of FIG. 11.
Figure 14:
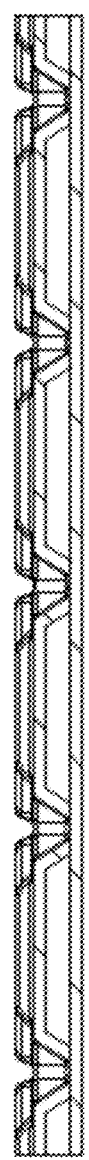
FIG. 14 is a schematic cross-sectional view taken along line B-B of FIG. 11.
Figure 15:
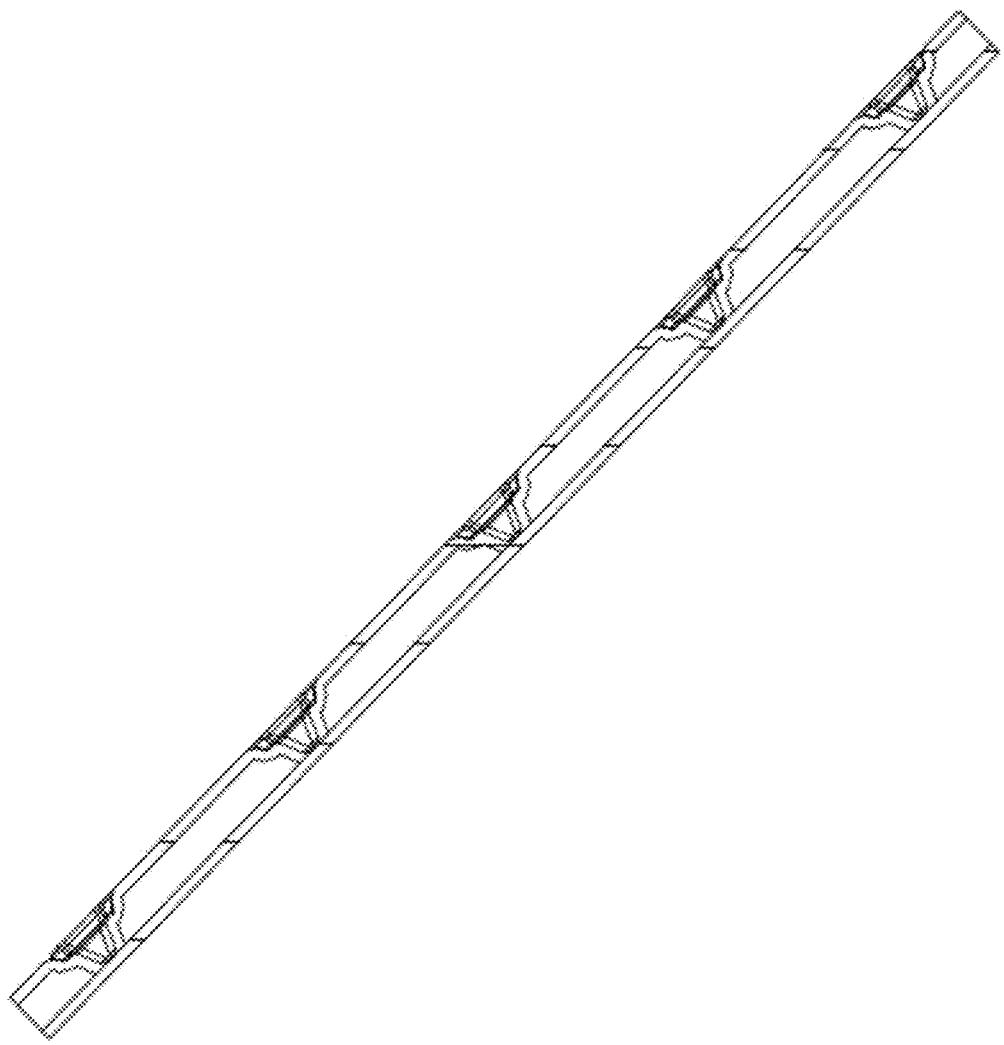
FIG. 15 is a schematic cross-sectional view taken along line C-C of FIG. 11.

Like the depressions, protrusions 140 can be distributed uniformly, generally uniformly, or non-uniformly across at least a portion of the panel. Protrusions 140 can be formed at any suitable positions independent from depressions 120 or related to depressions 120. The number of the protrusions can the same as or different from the number of depressions. For instance, in some exemplary embodiments, at least some protrusions (e.g., protrusions in at least a subset of the plurality of protrusions) are arranged alternately with some depressions (e.g., depressions in at least a subset of the plurality of depressions) across at least a portion of the panel. In an exemplary embodiment, all protrusions are arranged alternately with the depressions. By way of example, FIGS. 1 and 4 illustrate the depressions and protrusions distributed uniformly across the panel and alternating with each other.

In some exemplary embodiments, adjacent protrusions are separated by a distance greater than a thickness of the structure. For instance, in an exemplary embodiment, the distance separating two adjacent protrusions is more than about 2, more than about 3, or more than about 4 times the thickness of the structure. In another exemplary embodiment, the distance separating two adjacent protrusions is from about 3 to about 7 (e.g., about 3, 4, 5, 6, or 7) times the thickness of structure. In still exemplary embodiment, the distance separating two adjacent protrusions is from about 3 to about 5 (e.g., about 3, 4, or 5) times the thickness of structure. The distance separating two adjacent protrusions can be measured from center-to-center or edge to edge of the adjacent protrusions. By way of example, FIG. 1 illustrates the distance, d4, separating adjacent protrusions measured from center-to-center of the adjacent protrusions. In some exemplary embodiments, the distance separating two adjacent protrusions measured from edge to edge of the adjacent protrusions equals substantially the width of the gap (e.g., gap 125 or gap 126) between the two adjacent protrusions.

The distance separating adjacent protrusions can be the same as or different from the distance separating adjacent depressions. In an exemplary embodiment where the depressions and protrusions are uniformly and alternatively distributed, the distance separating adjacent protrusions measured from center-to-center of the adjacent protrusions is substantially the same as the distance separating adjacent depressions measured from center-to-center of the adjacent depressions along the same direction (e.g., along the row or column direction).

In some exemplary embodiments, protrusion 140 includes an open base such as open base 141. In an exemplary embodiment, the open base of a protrusion is connected to hollow interior 113 formed between the first and second panel walls. Cross-sectional-wise, the open base can have any suitable regular or irregular shapes, including but not limited to polygon (e.g. triangle, rectangle, square, diamond), circle, oblong, oval, or the like.

Protrusion 140 also includes a closed cover, such as closed cover 142, that surrounds and covers the open protrusion base. The closed protrusion cover of a protrusion can have any suitable regular or irregular shapes, including but not limited to substantially arched, rounded, dome, pointed or planar shapes. In some exemplary embodiments, for at least some protrusions, the closed protrusion cover includes a top and a side wall that surrounds the open protrusion base and connects the top with the open protrusion base.

For instance, by way of example, FIGS. 1-5 illustrate closed protrusion cover 142 includes a substantially arched or dome-shaped top, such as top 143, and a side wall, such as side wall 144, that surrounds the open protrusion base and connects the top with the open protrusion base. In an exemplary embodiment, an edge, such as edge 145, between the top and side wall of the closed protrusion cover is arched.

As another example, FIGS. 11-15 illustrate closed protrusion cover 142 includes a substantially planar top, such as top 146, and a side wall, such as side wall 147, that surrounds the open protrusion base and connects the top with the open protrusion base. In some exemplary embodiments, top 146 is substantially parallel to the second panel wall. In an exemplary embodiment, for at least a subset of protrusions, top 146 is substantially planar and parallel to the second panel wall. The planar tops collectively form (or are considered as) a third panel wall such as panel wall 114. In some exemplary embodiments, a trench, such as trench 148 is formed between the side walls of adjacent protrusions in the subset of the plurality of protrusions. In an exemplary embodiment, the trench connects two adjacent depressions, e.g., extending from one depression to another depression adjacent to the side walls of the protrusions that form the trench. The trench has a width defined by a distance separating the two side walls of the protrusions. The width of the trench can be either greater than, equal to, or less than a width of an adjacent depression.

In some exemplary embodiments, the structure includes additional, optional or alternative features. For instance, referring to FIGS. 6-10, in some exemplary embodiments, a structure of the present invention includes a plurality of ribs, such as rib 160, monolithically formed with the panel and thus creates a unitary one-piece structure. Rib 160 can have any suitable shape and size and can be oriented in any suitable orientation. Different ribs can be but do not have to be identical or substantially the same as each other. For instance, different ribs can have the same or different shapes or sizes, or can be arranged in the same or different orientations. By way of example, FIGS. 6-10 illustrates the plurality of ribs 160 monolithically formed with the second panel wall and/or protrusions 140, each protruding outwardly toward the exterior of the panel (e.g., protruding in a direction opposite to the first panel). In an exemplary embodiment, a rib is a crease, a ridge or the like formed at the second panel wall and/or protrusion. In some exemplary embodiments, a rib extends from one protrusion, across a gap (e.g., gap 125 or gap 126), to another protrusion. In a non-limiting exemplary embodiment, the height of a rib (e.g., the distance measured from the second panel to the top of the rib) is about 3.5 mm or the like.

Referring now to FIGS. 16-19, there is depicted exemplary structure 200 in accordance with some exemplary embodiments of the present disclosure. As shown, structure 200 includes a panel, such as panel 210. Like panel 110, panel 210 usually includes multiple walls and a generally hollow interior. For instance, in some exemplary embodiments, panel 210 includes first panel wall 111, second panel wall 112 and generally hollow interior 113. First panel wall 111 and second panel wall 112 are spaced apart from each other (e.g., in the vertical direction of FIG. 17), creating generally hollow interior 113 in between.

Figure 16:
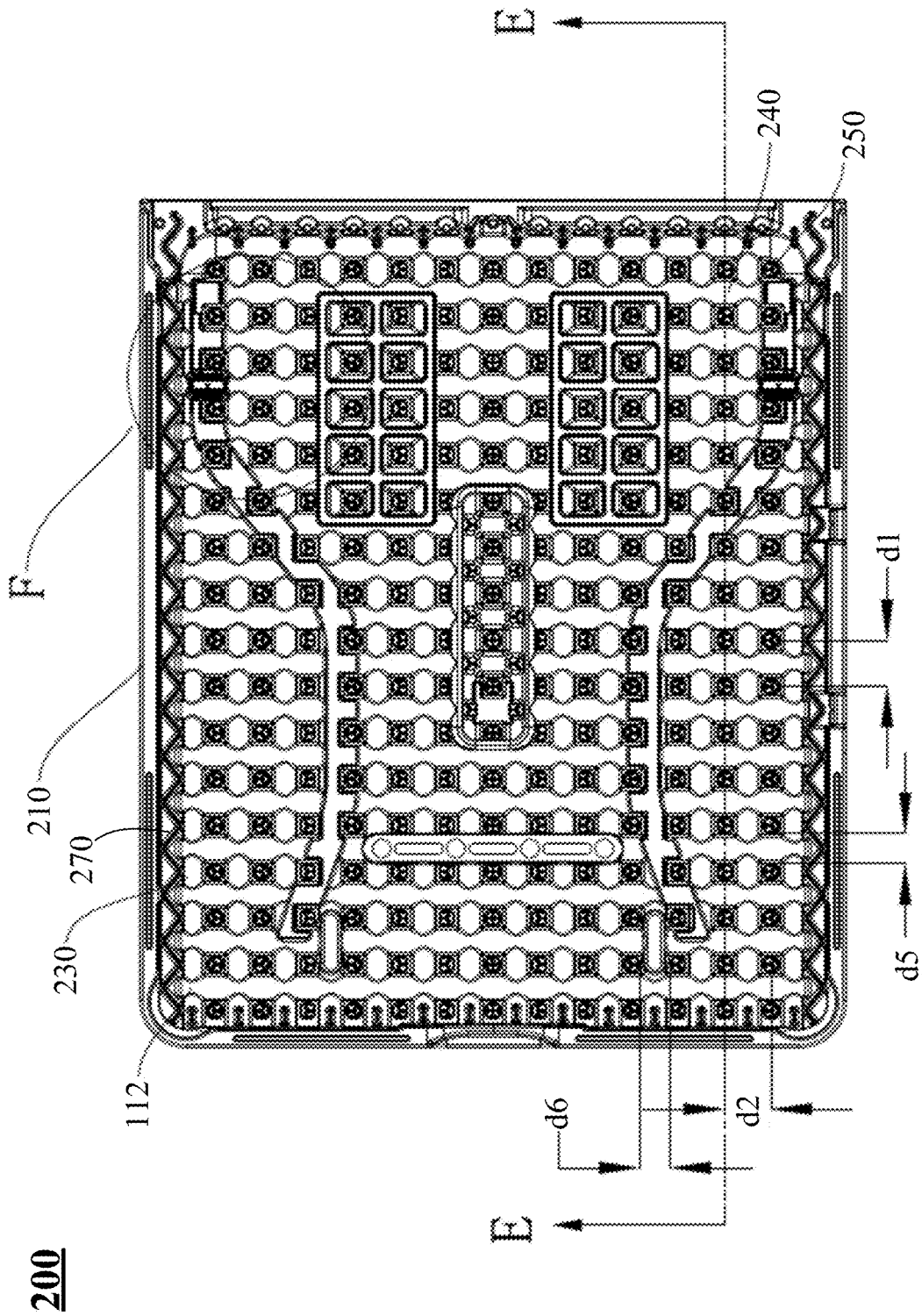
FIG. 16 is a bottom view illustrating an exemplary structure in accordance with some exemplary embodiments of the present disclosure.
Figure 17:
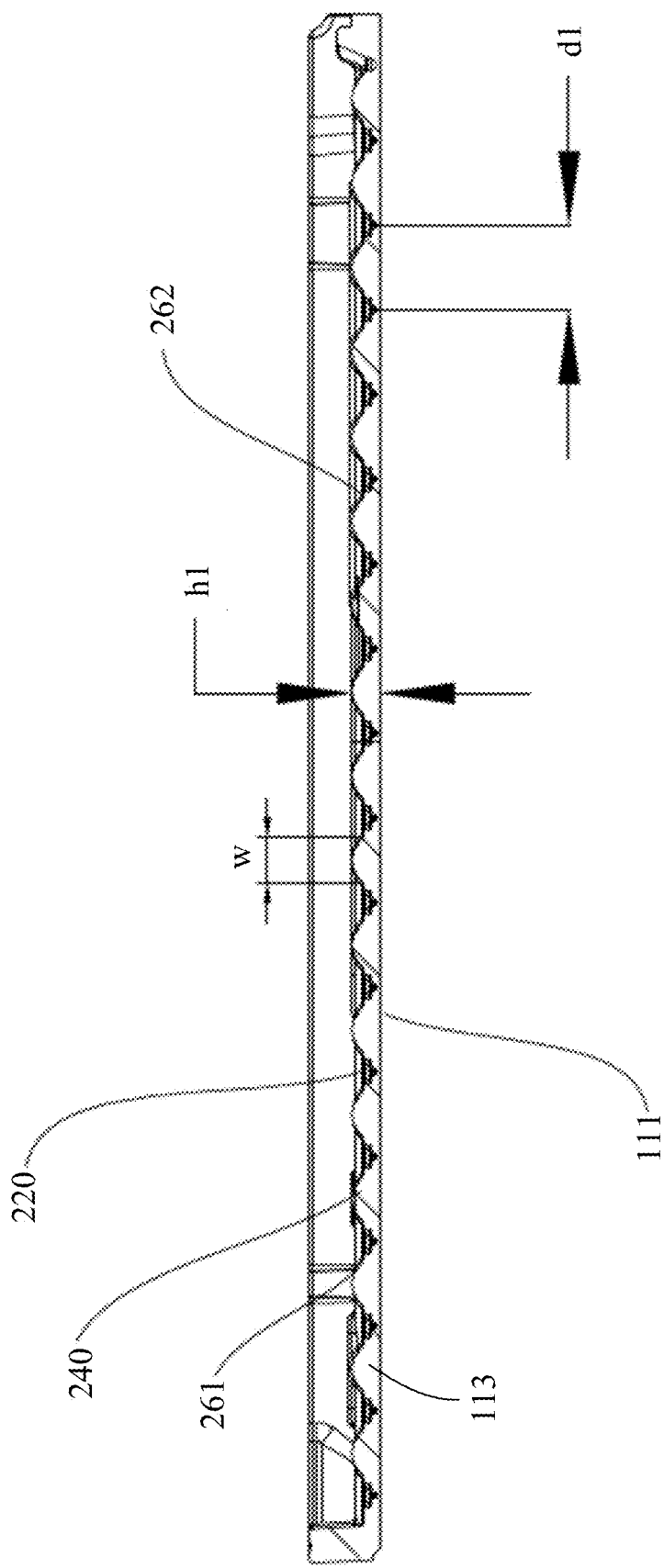
FIG. 17 is a schematic cross-sectional view taken along line E-E of FIG. 16.

In some exemplary embodiments, structure 200 includes a plurality of first depressions, such as depression 220, monolithically formed with the panel. Like depression 120, different depressions 220 can be but do not have to be identical or substantially the same as each other. For instance, different depressions 220 can have the same or different shapes or sizes, or can be arranged in the same or different orientations. By way of example, FIGS. 16 and 17 illustrate substantially the same or identical depressions 220 monolithically formed with the second panel wall, each recessing from the second panel wall toward the interior of the panel (e.g., toward the first panel wall). Also, like depressions 120, depressions 220 can be distributed uniformly, generally uniformly, or non-uniformly across at least a portion of the panel, in which adjacent depressions are generally spaced apart from each other.

In some exemplary embodiments, at least of a subset of the plurality of first depressions is arranged into a plurality of depression rows in a first direction (e.g., x-direction in FIG. 16) and a plurality of depression columns in a second direction (e.g., y-direction in FIG. 16) across at least a portion of the panel. Distances between different adjacent depression rows can be the same or different. Similarly, distances between different adjacent depression columns can be the same or different. In addition, a distance between adjacent depression rows can be the same as a distance between adjacent depression columns or different from a distance between adjacent depression columns. By way of example, FIG. 16 illustrates a substantially uniform distribution with a constant distance between adjacent depression rows and between adjacent depression columns.

In some exemplary embodiments, structure 200 includes a plurality of first protrusions, such as first protrusion 230, and a plurality of second protrusions, such as second protrusion 240. The plurality of first protrusions and the plurality of second protrusions are monolithically formed with the panel, protruding from the second panel wall toward an exterior of the panel. The first protrusions are elongated in the first direction, and the second protrusions are elongated in the second direction. In an exemplary embodiment, first protrusion 230 or second protrusion 240 has a tunnel shape or the like.

In some exemplary embodiments, first protrusions in at least a subset of the plurality of first protrusions are arranged alternatively with depression rows in at least a subset of the plurality of depression rows. Similarly, second protrusions in at least a subset of the plurality of second protrusions are arranged alternatively with depression columns in at least a subset of the plurality of depression columns. The first protrusions in the subset of the plurality of first protrusions and the second protrusions in the subset of the plurality of second protrusions cross each other. Collectively, the first depressions, first protrusions, and second protrusions enhance a strength of the blow-molded unitary structure.

In some exemplary embodiments, a reinforcement member, such as reinforcement member 250, is monolithically formed at a first depression in the plurality of first depressions. In an exemplary embodiment, the number of reinforcement members is the same as the number of first depressions, e.g., each first depression in the plurality of first depressions is formed with a reinforcement member. In another exemplary embodiment, the number of reinforcement members is different from or less than the number of first depressions, e.g., one or more first depressions in the plurality of first depressions are not formed with a reinforcement member. The reinforcement members further enhance the strength of the structure.

Reinforcement member 250 can be formed at a side wall of the first depression or at the bottom of the first depression. In some exemplary embodiments, the reinforcement member is formed at the bottom of the first depression and recessed further from the bottom of the first depression towards the first panel wall. In an exemplary embodiment, the reinforcement member forms a contact with the first panel wall.

Figure 18:
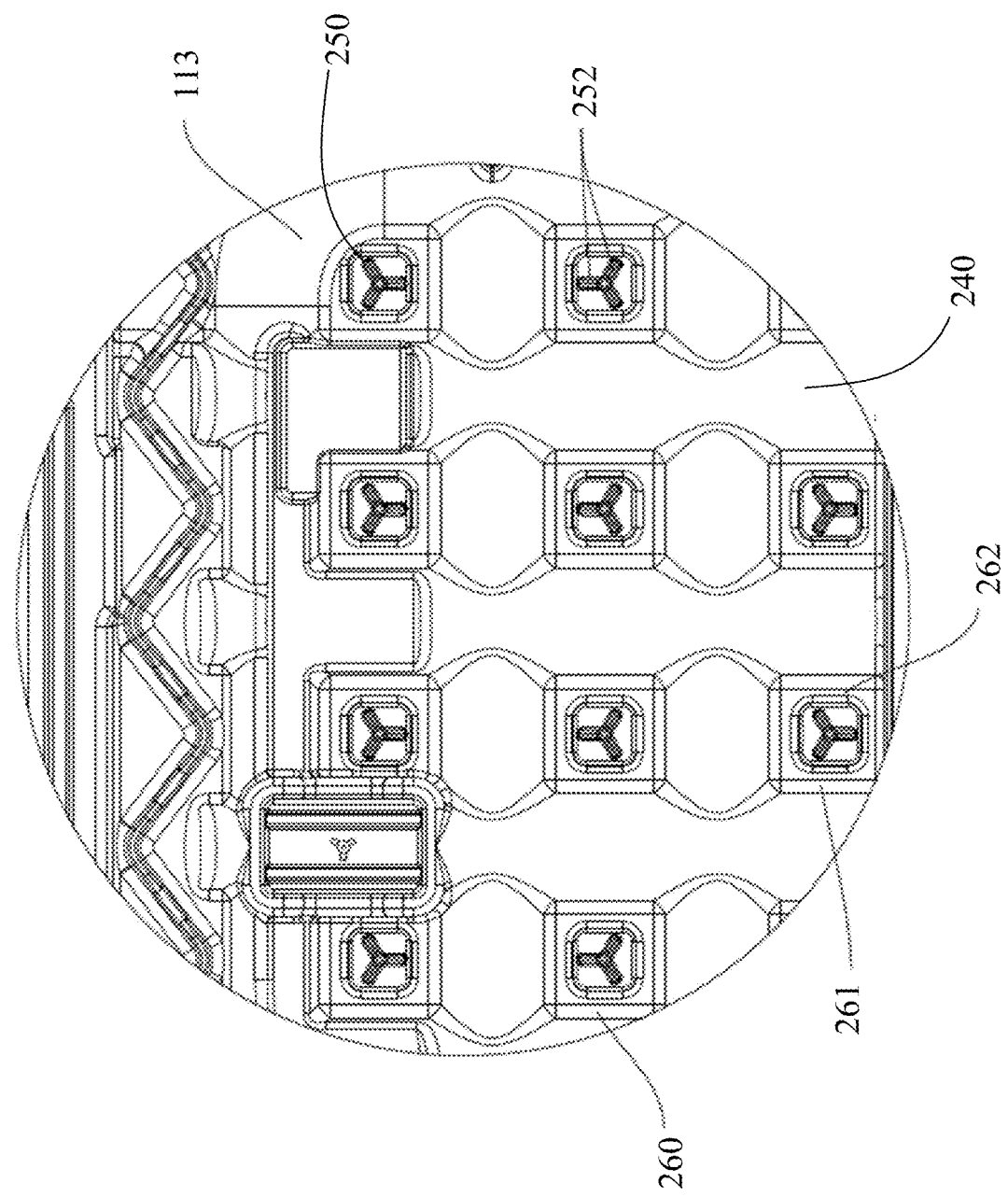
FIG. 18 is an enlarged view taken along circle F of FIG. 16.
Figure 19:
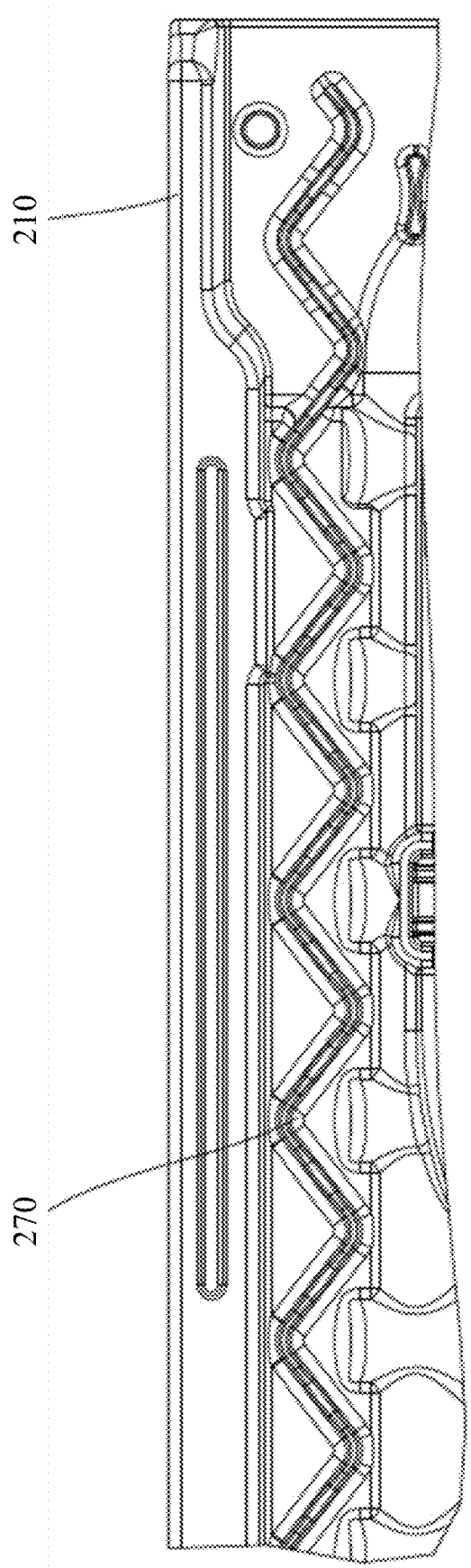
FIG. 19 is a partially enlarged view of FIG. 16.

Reinforcement member 250 can have any suitable regular or irregular shapes. In some exemplary embodiments, reinforcement member 250 includes a plurality of reinforcement elements, such as reinforcement element 252. In an exemplary embodiment, the plurality of reinforcement elements are connected with each other at their ends. For instance, by way of example, FIGS. 16 and 18 illustrate reinforcement member 250 having three reinforcement elements 252 connected with each other at their ends to form a three-pointed star shape.

First protrusion 230 and second protrusion 240 can have the same height or different heights. For instance, in an exemplary embodiment, first protrusion 230 has a height substantially the same as second protrusion 240. In another exemplary embodiment, first protrusion 230 has a height greater than second protrusion 240. In still another exemplary embodiment, first protrusion 230 has a height less than second protrusion 240. The height of the first or second protrusion is generally measured from a peak of the first or second protrusion to the first panel, as illustrated by "h1" in FIG. 17.

In some exemplary embodiments, a height of a first or second protrusion is about $1/7$ to about $4/5$ of a distance between two adjacent first depressions, about $1/6$ to about $3/4$ of a distance between two adjacent first depressions, or about $1/5$ to about $2/3$ of a distance between two adjacent first depressions. In an exemplary embodiment, the distance between two adjacent first depressions is measured from a center of one first depression to a center of the other first depression, as illustrated by "d1" in FIG. 17. In FIG. 17, "d1" and "d2" indicate the distance separating adjacent first depressions in a row or column, respectively, measured from center-to-center of the adjacent depressions. "d5" and "d6" indicate the distance separating adjacent first depressions in a row or column, respectively, measured from edge-to-edge of the adjacent depressions.

In some exemplary embodiments, a width of a first or second protrusion is about $1/7$ to about $1/2$ of a distance between two adjacent first depressions, about $1/6$ to about $2/5$ of a distance between two adjacent first depressions, or about $1/5$ to about $1/3$ of a distance between two adjacent first depressions. In an exemplary embodiment, the width of a first or second protrusion is measured from an edge of the first or second protrusion on the second panel to an opposite edge of the first or second protrusion on the second panel, as illustrated by "w" in FIG. 17.

In some exemplary embodiments, first depression 220 in the plurality of depression rows or in the plurality of depression columns is surrounded by a transition member, such as transition member 260. The transition member connects the first depression with adjacent first and second protrusions. In some exemplary embodiments, the transition member includes multiple steps. For instance, in an exemplary embodiment, the transition member includes first step 261 and second step 262. The second step is surrounded by the first step and recessed from the first step toward the first panel wall.

In some exemplary embodiments, structure 200 includes additional, alternative or optional elements. For instance, in some exemplary embodiments, structure 200 includes one or more second depressions, such as second depression 270, monolithically formed with the panel to further enhance the strength of the structure. Like first depression 220, second depression 270 recesses from the second panel wall toward the interior of the panel. Unlike first depression 220, second depression 270 is generally curvy and disposed along one or more edges of the panel. In some exemplary embodiments, the second depression has a substantially wave shape, as illustrated in FIG. 16. In an exemplary embodiment, the second depression is disposed along two, three or four edges of the panel.

The depressions, protrusions, ribs, trenches, reinforcement members or the like, or any combination thereof, enhance the strength of the structure and thus prevent the structure from bending, warping or deforming.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first panel wall could be termed a second panel wall, and, similarly, a second panel wall could be termed a first panel wall, without changing the meaning of the description, so long as all occurrences of the "first panel wall" are renamed consistently and all occurrences of the "second panel wall" are renamed consistently.

What is claimed is:

1. A blow-molded unitary structure comprising:
   a panel comprising a first panel wall and a second panel wall spaced apart from the first panel wall;
   a plurality of depressions monolithically formed with the panel, each recessing from the second panel wall toward an interior of the panel, wherein each depression in the plurality of depressions comprises:
     an open depression top at the second panel wall;
     a closed depression bottom opposite to the open depression top; and
     a depression side wall connecting the open depression top and the closed depression bottom; and
   a plurality of protrusions monolithically formed with the panel, each protruding from the second panel wall toward an exterior of the panel, wherein each protrusion in the plurality of protrusions comprises:
     an open protrusion base at the second panel wall; and
     a closed protrusion cover surrounding the open protrusion base;
   wherein depressions in at least a subset of the plurality of depressions are arranged alternately with protrusions in at least a subset of the plurality of protrusions across at least a portion of the panel, and wherein the plurality of depressions and the plurality of protrusions collectively enhance a strength of the blow-molded unitary structure;
   wherein the closed protrusion cover of each protrusion in at least a subset of the plurality of protrusions comprises a top and a side wall connecting the top with the open protrusion base of each respective protrusion; and
   wherein a trench is formed between the side walls of adjacent protrusions in the subset of the plurality of protrusions.

2. The blow-molded unitary structure of claim 1, further comprising a plurality of ribs monolithically formed with the panel, each protruding outwardly toward the exterior of the panel, wherein each respective rib in at least a subset of the plurality of ribs connects corresponding adjacent protrusions in the plurality of protrusions.

3. The blow-molded unitary structure of claim 1, wherein the second panel wall is substantially parallel to the first panel wall.

4. The blow-molded unitary structure of claim 1, wherein a depression is separated from its adjacent depression in the plurality of depressions by a distance that is from substantially 3 times to substantially 7 times a thickness of the structure.

5. The blow-molded unitary structure of claim 1, wherein the closed depression bottom is formed monolithically at the first panel wall or is a part of the first panel wall.

6. The blow-molded unitary structure of claim 1, wherein the subset of the plurality of depressions and the subset of the plurality of protrusions are arranged substantially uniformly across the portion of the panel.

7. The blow-molded unitary structure of claim 1, wherein the plurality of depressions and the plurality of protrusions are arranged substantially across the panel.

8. The blow-molded unitary structure of claim 1, wherein the closed protrusion cover of each protrusion in at least a subset of the plurality of protrusions is substantially rounded.

9. The blow-molded unitary structure of claim 1, wherein the top of the closed protrusion cover is arched or dome-shaped.

10. The blow-molded unitary structure of claim 1, wherein an edge between the top and side wall of the closed protrusion cover is arched.

11. The blow-molded unitary structure of claim 1, wherein the top of the closed protrusion cover is substantially planar and parallel to the second panel wall.

12. The blow-molded unitary structure of claim 1, wherein the trench connects two depressions adjacent to the side walls.

13. The blow-molded unitary structure of claim 12, wherein the trench has a width that is substantially equal to or less than a width of any one of the two depressions.

14. A blow-molded unitary structure comprising:
    a panel comprising a first panel wall and a second panel wall spaced apart from the first panel wall;
    a plurality of depressions monolithically formed with the panel, each recessing from the second panel wall toward an interior of the panel; and
    a plurality of protrusions monolithically formed with the panel, each protruding from the second panel wall toward an exterior of the panel, wherein each protrusion in the plurality of protrusions comprises:
      an open protrusion base at the second panel wall; and
      a closed protrusion cover surrounding the open protrusion base, wherein the closed protrusion cover of each protrusion in at least a subset of the plurality of protrusions comprises a substantially planar top and a side wall connecting the substantially planar top with the open protrusion base of each respective protrusion, and wherein a trench is formed between the side walls of adjacent protrusions in the subset of the plurality of protrusions, and connects two depressions adjacent to the side walls.

15. The blow-molded unitary structure of claim 14, wherein the trench has a width that is substantially equal to or less than a width of any one of the two depressions.

16. A blow-molded unitary structure comprising:
a panel comprising a first panel wall and a second panel wall spaced apart from the first panel wall;
a plurality of depressions monolithically formed with the panel, each recessing from the second panel wall toward an interior of the panel;
a plurality of protrusions monolithically formed with the panel, each protruding from the second panel wall toward an exterior of the panel, wherein each protrusion in the plurality of protrusions comprises:
an open protrusion base at the second panel wall; and
a closed protrusion cover surrounding the open protrusion base; and
a plurality of ribs monolithically formed with the panel, each protruding outwardly toward the exterior of the panel, wherein each respective rib in at least a subset of the plurality of ribs connects corresponding adjacent protrusions in the plurality of protrusions;
wherein the closed protrusion cover of each protrusion in at least a subset of the plurality of protrusions comprises a top and a side wall connecting the top with the open protrusion base of each respective protrusion; and
wherein a trench is formed between the side walls of adjacent protrusions in the subset of the plurality of protrusions.

17. The blow-molded unitary structure of claim 16, wherein the top of the closed protrusion cover of each protrusion in at least the subset of the plurality of protrusions is an arched or dome-shaped top and the side wall connects the arched or dome-shaped top with the open protrusion base of each respective protrusion.

18. The blow-molded unitary structure of claim 17, wherein an edge between the arched or dome-shaped top and side wall of the closed protrusion cover is arched.

\* \* \* \* \*